United States Patent [19]

Takagi et al.

[11] 4,052,908
[45] Oct. 11, 1977

[54] V-BELT TYPE AUTOMATIC TRANSMISSION DRIVE CLUTCH DEVICE

[75] Inventors: Izumi Takagi; Haruo Kitai, both of Akashi, Japan

[73] Assignee: Kawasaki Heavy Industries, Ltd., Japan

[21] Appl. No.: 648,807

[22] Filed: Jan. 13, 1976

[30] Foreign Application Priority Data

Jan. 14, 1975 Japan ................ 50-7583[U]

[51] Int. Cl.² .................................... F16H 55/52
[52] U.S. Cl. .................................... 74/230.17 E
[58] Field of Search ............ 74/230.17 E; 192/105 C

[56] References Cited

U.S. PATENT DOCUMENTS

| 2,310,081 | 2/1943 | Hill | 74/230.17 E |
|---|---|---|---|
| 3,401,582 | 9/1968 | Jaulmes | 74/230.17 E |
| 3,812,731 | 5/1974 | Sugimoto et al. | 74/230.17 E |
| 3,939,720 | 2/1976 | Aaen et al. | 74/230.17 E |
| 3,961,539 | 6/1976 | Tremblay et al. | 74/230.17 E |

FOREIGN PATENT DOCUMENTS 26,722  11/1913  United Kingdom ......... 74/230.17 E

Primary Examiner—Samuel Scott
Assistant Examiner—Allan R. Burke
Attorney, Agent, or Firm—Wenderoth, Lind & Ponack

[57] ABSTRACT

An improved drive clutch device for a V-belt type automatic transmission wherein a stationary sheave is fixed to a driving shaft while a movable sheave opposed to said stationary sheave is slidably mounted on the driving shaft. A swingable cam weight and a roller in engagement with the cam weight are correlatively supported by driving shaft and movable sheave respectively. The movable sheave is caused to slide toward the stationary sheave by centrifugal force caused by rotation of the cam weight, whereby the pulley diameter is varied. The movable sheave is cylindrical in shape and has at one end an opening which is covered by a cover cast integrally with a starter pulley.

1 Claim, 4 Drawing Figures

V-BELT TYPE AUTOMATIC TRANSMISSION DRIVE CLUTCH DEVICE

This invention relates to a drive clutch device connected to the driving shaft side of a V-belt type automatic transmission comprising a pair of pulley type clutch mechanisms for a V-belt, each having a stationary sheave secured to a shaft and an opposite movable sheave axially slidable along the shaft, and more particularly, to an improved drive clutch device which is so designed that a cam weight having a cam surface for converting centrifugal force into axial thrust and a roller in engagement with said cam weight are correlatively supported by the aforementioned driving shaft and by the movable sheave respectively, whereby the movable sheave is urged to slide toward the stationary sheave by centrifugal force caused by the rotation of the aforementioned cam weight, through the medium of the roller, and thus the pulley diameter is varied.

The conventional drive clutch drive for an automatic transmission of the above-mentioned type is designed as shown in FIG. 4. In FIG. 4, a main shaft $b$ is secured to a driving shaft $a$ and a stationary sheave $c$ is fixed to the main shaft $b$. A cylindrical, enclosed type movable sheave $d$ opposed to said stationary sheave $c$ and defining therewith a V-shaped groove is slidably mounted on the main shaft $b$. A cam weight $e$ is pivotally supported by said movable sheave $d$ and a roller $f$ is pivotally supported on the aforementioned main shaft $b$ by a bracket $g$. Said cam weight $e$ and said roller $f$ are in engagement with each other for cooperative action, namely, centrifugal force caused by the rotation of said cam weight $e$ urges the movable sheave $d$ toward the stationary sheave $c$, with the roller $f$ as a pivotal point. However, in the above described conventional drive clutch device, the movable sheave $d$ is a cylindrical body having at its one end an opening, to the end surface of which a cover $h$ is integrally fixed to enclose the movable sheave $d$. A starter pulley $i$ is riveted to said cover. While this starter pulley $i$ is generally made of steel, the cover $h$ is made of cast-steel. Since the cover $h$ and the starter pulley $i$ are connected to each other by riveting, they are liable to become disconnected due to vibrations caused by variations of torque transmitted from the engine. Therefore, it is necessary to make the rivet diameter relatively large or to use a relative large member rivets. This results in increasing the manufacturing cost. Starter pulleys which are integrated with covers are sold on the market but most of them are steel starter pulleys welded to steel covers and are liable to be cracked at the welded joint, with the result that the starter pulley comes off the cover during high speed rotation. Therefore, special care must be taken in welding and in the case of mass production, it is difficult to ensure constant quality.

The present invention has been made to overcome the above-described disadvantages of the conventional drive clutch device. It provides a V-belt type automatic transmission drive clutch device in which a cover to enclose the end surface of an opening at one end of a cylindrical movable sheave and a starter pulley are formed as an integral casting to completely prevent them from becoming disengaged.

The nature and advantages of the present invention will be apparent from the following description of a preferred embodiment of the present invention and taken together with the accompanying drawings, in which.

Figure 1:
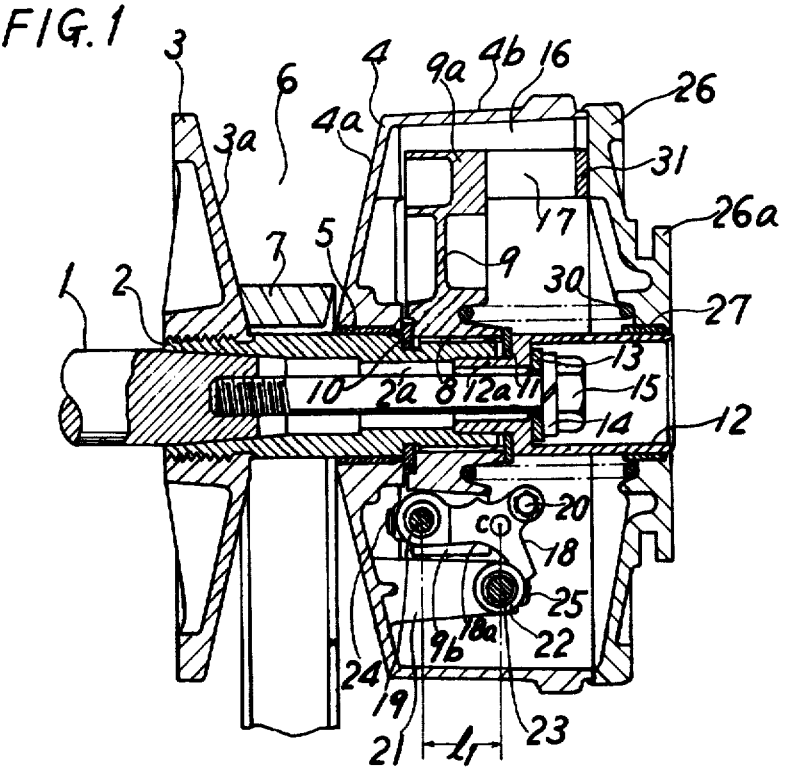
FIG. 1 is a longitudinal sectional elevation of the central part of an embodiment of the present invention, in its rest state.
Figure 2:
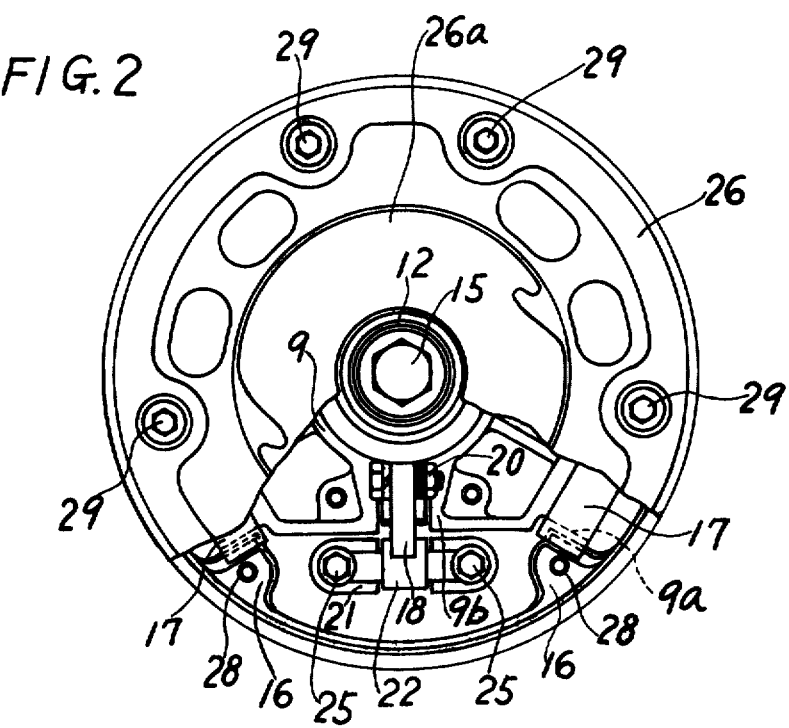
FIG. 2 is a front view of the central part of the embodiment of the present invention, partly broken away, shown in FIG. 1.

In FIG. 1 and FIG. 2, numeral 1 denotes a driving shaft on the engine output side. A main shaft 2 is connected integrally with said driving shaft 1 by means of a taper engagement. Secured to said main shaft 2 is a stationary sheave 3 having a conical surface 3a on one side. A movable sheave 4 of cylindrical shape having on one side a conical surface 4a opposed to aforementioned surface 3a and on the other side an opening, is mounted slidably on said driving shaft 2, through the medium of a bushing 5. The conical surfaces 3a and 4a of the stationary sheave 3 and the movable sheave 4 respectively, define therebetween a V-shaped groove 6, in which a V-belt is put. A spline 8 is formed on the outer periphery of the axial end portion of the aforementioned main shaft 2. A bracket 9 is engaged with said spline 8 by means of key lock and is fixed to the main shaft 2 by means of a split washer 10 and a flat washer 11. Fixed axially to the axial end surface of the aforementioned main shaft 2 is a retainer 12 having a diameter larger than the outside diameter of the above-mentioned spline 8. This retainer 12 has at its one end portion a shoulder part of a smaller diameter 12a which is inserted into a central hole 2a in the main shaft 2 and is fixed axially to the driving shaft 1 by fastening a bolt 15 into the driving shaft 1 at the end surface of the shoulder part 12a (within the retainer 12), through the medium of a flat washer 13 and a spring washer 14.

The aforementioned bracket 9 has several spider parts 9a at its periphery. On the inner periphery of the cylindrical part 4b of the movable sheave 4, a number of ribs 16 equal to the number of spider parts 9a project in the radially inward direction so that the spider part 9a engage with the corresponding rib 16 through the medium of a bushing 17 to transmit torque from the main shaft 2 to the movable sheave 4. The rib 16 is slidable with respect to the spider part 9a through the bushing 17 when the movable sheave 4 slides. The aforementioned bracket 9 has a pair of supports 9b spaced circumferentially therearound, on which a cam weight 18 which converts centrifugal force into axial thrust is pivotally and swingably supported through a pin 19. This cam weight 18 has a concave cam surface 18a and has thereon an additional weight 20 at the free end thereof. On the other hand, the movable sheave 4 is provided with a roller support 21, at the end of which a roller 22 is rotatably mounted on a pin 23, in engagement with the cam surface 18a of the cam weight 18. The pivotal point (pin 19) of the cam weight 18 is positioned radially inwardly of the axis of rotation (pin 23) of the roller 22 and also in the same direction as the swinging of the cam weight 18 with respect to the pivotal point of the roller 22. Numerals 24 and 25 are bolts to fix the pin 19 and the pin 23 respectively.

Over the opening of the aforementioned movable sheave 4, a cover 26 to cover said opening is slidably engaged with the retainer 12 through the medium of a bushing 27 and is fixed to the rib 16 of the movable sheave 4 by bolts 29 threaded into a threaded holes 28 in the end surfaces of the ribs 16. A starter pulley 26a is formed integrally with this cover 26; more particularly, the cover 26 and the starter pulley 26a are integrally cast in a single casting. Inserted between the cover 26 and the bracket 9 is a coil spring 30 which biases the movable sheave 4 in the direction away from the stationary sheave 3, namely, in the direction to cause the V-shaped groove to widen in the rest state of the device. Fixed to the inner wall surface of the cover 26 and opposite to the spider part 9a of the bracket 9 is a bushing 31 made of resin which acts as a stop when the movable sheave 4 slides toward the stationary sheave 3 to the full extent (namely, when the pulley diameter is at its maximum). In this embodiment, the resin bushing 31 and the aforementioned bushing 17 are formed integrally with each other. Other embodiments of the retainer 12 may be used, for example, a retainer of cylindrical shape having a diameter larger than the outside diameter at the end portion of the main shaft 2 and having on the inner peripheral surface of its intermediate part an annular protrusion projecting in the radially inward direction, can be engaged with the axial end portion of the main shaft 2 and can be fixed by means of a bolt to the annular protrusion. The retainer 12 may be formed integrally with the flat washer 11.

Figure 3:
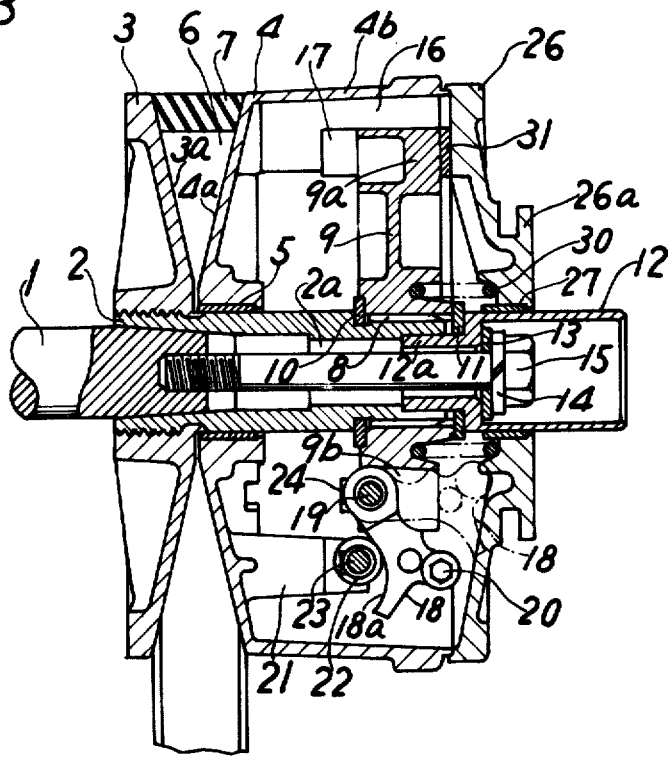
FIG. 3 is a longitudinal sectional elevation of the central part of the embodiment of the present invention shown in FIG. 1, with the pulley diameter at the maximum.
Figure 4:
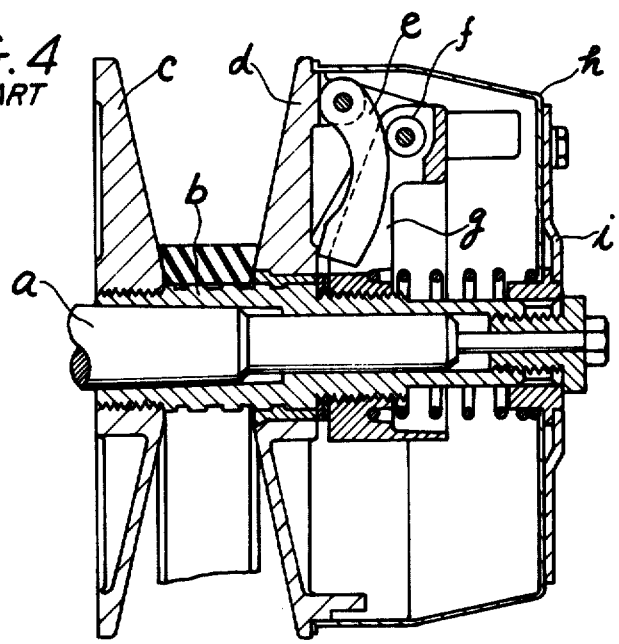
FIG. 4 is a longitudinal sectional elevation of the central part of a conventional drive clutch device.

Referring now to the operation of the above-described embodiment, as seen in FIG. 1 and FIG. 3, when the driving shaft 1 begins to rotate at the starting of the engine, the movable sheave 3 and the bracket 9 are rotated through the medium of the main shaft 2. With the rotation of said bracket 9, the spider part 9a engages the rib 16 through the medium of the bushing 17, whereby the movable sheave 4 and the cover 26 (including the starter pulley 26a) integral with said movable sheave 4 are rotated. At this time, the rib 16 is subjected to very great impact and pressure. However, the rib 16 is rigid enough to withstand such external forces because it is integral with the back side of the movable sheave 4 and the cylindrical part 4b, and its end surface is supported by the cover 26 through the medium of the bolt 29.

When all the rotary members (stationary sheave 3, movable sheave 4, bracket 9, cover 26, etc.) run at a high speed, the cam weight 18 is urged to swing around the pin 19 as a pivotal point by centrifugal force caused by high speed rotation of the bracket 9 and presses the roller 22 which is in contact with the concave cam surface 18a of said cam weight 18. This pressure is converted into axial thrust, which slides the movable sheave 4 toward the stationary sheave 3 against the spring force of the coil spring 30. According to this sliding of the movable sheave 4, the width of the V-shaped groove (pulley diameter) is varied and thus the rotation ratio is changed infinitely. At this time, the above-mentioned pressure (axial thrust) is a very great force but since the pivotal point (pin 19) of the cam weight 18 which acts as a belt pulley axial thrust adjuster and as a centrifugal weight is positioned radially inwardly of the axis of rotation (pin 23) of the roller 22 and in the same direction as the sliding of the cam weight 18 with respect to the axis of rotation of said roller 22 and also the cam surface 18a of the cam weight 18 is concave, the contact between the cam surface 18a of the cam weight 18 and the roller 22 is a concave contact along all the operating surface and accordingly contact surface pressure is reduced to a great degree. MOreover, since the axial distance $l_1$ between the center of gravity c and the pivotal point (pin 19) of the cam weight 18 is large, even the accuracy (precision) error due to irregularity of processing will have very little influence on the above-mentioned axial thrust.

If the speed at which the driving shaft 1 is running is increased, the movable sheave 4 slides nearer to the stationary sheave 3, and the pulley diameter reaches its maximum, when the sliding of the movable sheave 4 is checked by means of the resin bushing 31 provided on the inner wall surface of the cover 26. While this resin bushing 31 acts as a stop, it mitigates the collision between the spider part 9a of the bracket 9 and the cover 26 and also prevents wear thereof.

The movable sheave 4 slides with the main shaft 2 and the retainer 12 as guides. Since the retainer 12 is separate from the main shaft 2 and has a diameter larger than the outside diameter of the spline 8 at the axial end portion of the main shaft, it is easy to assemble the movable sheave 4 and the bracket 9. Moreover, by making the minimum pulley diameter smaller, the range of variable speeds can be increased and it is possible to increase the strength of the retainer itself and the bearing area of the bushing 27 for covering the retainer.

According to the V-belt type automatic transmission drive clutch device of the present invention, a starter pulley is cast integrally with a cover which covers the end surface of an opening of the enclosed type movable sheave and therefore the starter pulley and the cover will not disengage. Thus, the drive clutch device according to the present invention ensures safety in operation, constant quality in mass production and ease of assembling.

What is claimed is:

1. In a drive clutch device for the V-belt type automatic transmission having a driving shaft, a stationary sheave having a sheave surface and fixed to the driving shaft, a movable sheave having a sheave surface and a hollow cylindrical portion which extends in the opposite direction from the sheave surface and has the free end thereof open, said movable sheave being rotatably and axially slidably mounted on the driving shaft with the sheave surface thereof opposed the stationary sheave, said sheave surface of the movable sheave and said sheave surface of the stationary sheave defining therebetween a V-shaped groove in which a V-belt is positioned, a bracket fixed to said driving shaft for transmitting rotation of the driving shaft to said movable sheave, a spring interposed between said bracket and said cover in for biasing the movable sheave in a direction away from the stationary sheave, a roller rotatably mounted on said movable sheave, and a cam weight acting as a centrifugal weight and pivotally supported on said bracket for swinging movement radially outwardly of said driving shaft and having a concave cam surface in engagement with said roller for urging said movable sheave to slide along said driving shaft against the force of said spring toward said stationary sheave when centrifugal force caused by rotation of said cam weight swings said cam outwardly, thereby varying the pulley diameter; the improvement comprising a cover enclosing the open end of the cylindrical portion of the movable sheave and also being slidable along the driving shaft, and having a starter pulley integrally cast thereon.

* * * * *